United States Patent [19]

Bellanger

[11] Patent Number: 5,604,690
[45] Date of Patent: Feb. 18, 1997

[54] SIGNAL FORM SYNTHESIZER ARRANGEMENT, TRANSMITTER STATION AND RECEIVER STATION COMPRISING SUCH AN ARRANGEMENT

[75] Inventor: Maurice Bellanger, Paris, France

[73] Assignee: U.S. Philips Corporation, New York, N.Y.

[21] Appl. No.: 405,338

[22] Filed: Mar. 16, 1995

[30] Foreign Application Priority Data

Mar. 23, 1994 [FR] France ................................. 94 03423

[51] Int. Cl.$^6$ ............................................. G06F 1/07
[52] U.S. Cl. ............................ 364/718; 364/607; 331/40; 455/76
[58] Field of Search ................................. 364/718, 720, 364/721

[56] References Cited

U.S. PATENT DOCUMENTS

| | | | |
|---|---|---|---|
| 4,380,743 | 4/1983 | Underhill et al. | 331/1 A |
| 4,704,585 | 11/1987 | Lind | 331/14 |
| 5,014,231 | 5/1991 | Reinhardt et al. | 364/718 |
| 5,311,560 | 5/1994 | Tatsumi et al. | 375/376 |
| 5,335,365 | 8/1994 | Ballantyne et al. | 455/76 |

OTHER PUBLICATIONS

Bellanger, "Tratement Numerique Du Signal", Collection Technique Et Scientifique Des Telecommunications, 2nd Edition, Mexico 1984, pp. 188–266, Chapters 11 and 12.

Primary Examiner—Roy N. Envall, Jr.
Assistant Examiner—Emmanuel L. Moise
Attorney, Agent, or Firm—Eugene J. Rosenthal

[57] ABSTRACT

A signal form synthesizer comprises a digital generator circuit (1) for generating the synthesis signal to produce a first series of digital samples which are representative of this signal and formed by binary words of N bits, and a digital-to-analog converter circuit (30) for producing an analog version of this signal. Furthermore, there is provided an assembly (40) for filtering in accordance with a band-pass characteristic curve the samples of the first series and for supplying to said digital-to-analog converter circuit (30) a second series of samples formed by binary words of N' bits, where N≧N'. A negative feedback loop (45) subtracts the samples of the second series from the samples of the first series.

12 Claims, 4 Drawing Sheets

5,604,690

SIGNAL FORM SYNTHESIZER ARRANGEMENT, TRANSMITTER STATION AND RECEIVER STATION COMPRISING SUCH AN ARRANGEMENT

TECHNICAL FIELD

The present invention relates to a frequency synthesizer arrangement, and to a transmitter station and a receiver station comprising such an arrangement.

BACKGROUND OF THE INVENTION

One prior art frequency synthesizer arrangement comprises a digital generator circuit for producing a first series of digital samples which are representative of the signal to be synthesized and are formed by binary words of N bits, and a digital-to-analog converter circuit for producing said signal in analog form.

The present invention also relates to a transmitter station and a receiver station comprising such an arrangement.

An arrangement of this type finds highly significant applications especially for processing sine-shaped signals having a given frequency and for constituting thus a direct digital frequency synthesizer. A description of such an arrangement will be found in U.S. Pat. No. 5,014,231.

A first requirement often imposed on this type of arrangement is that the produced signal must be very pure and a second requirement is that the signal must have no spurious sidebands. These sidebands are basically caused by the sine-shaped and periodic form to be synthesized. To satisfy this first requirement, it is possible to provide a large number of bits for the samples of the first series. For example, to obtain a sine curve having a purity of 84 dB, it is necessary that the output samples of the form generator circuit have 14 bits. This results in the formula:

$$N_b \geq R/6$$

where $N_b$ is the number of bits and

R is the ratio in decibels of the level of the sine curve to the levels of the spurious sidebands.

Then, when this type of synthesizer arrangement is intended to be used for high frequencies, for example, of the order of several hundred MHz, the problem is there to find a cost-effective digital-to-analog converter circuit. To satisfy the second requirement, said patent proposes to add a random number to the samples of the first series. If the level of these sidebands is reduced in this manner, it is at the cost of a general degradation of the purity of the signal, and then one cannot but include a costly digital-to-analog converter.

SUMMARY OF THE INVENTION

It is an object of the invention to avoid the use of a digital-to-analog converter circuit that processes a large number of bits.

Therefore, such a synthesizer arrangement according to the invention is characterized in that an assembly is provided for filtering in accordance with a band-pass characteristic curve the samples of the first series and for supplying to said digital-to-analog converter circuit a second series of samples formed by binary words of N' bits, where $N \geq N'$, and in that a negative feedback loop is provided for subtracting the samples of the second series from the samples of the first series.

BRIEF DESCRIPTION OF THE DRAWING

The following description with reference to the appended drawings all given by way of non-limiting example will make it easier to understand how the invention can be realised, in which.

DETAILED DESCRIPTION

Figure 1:
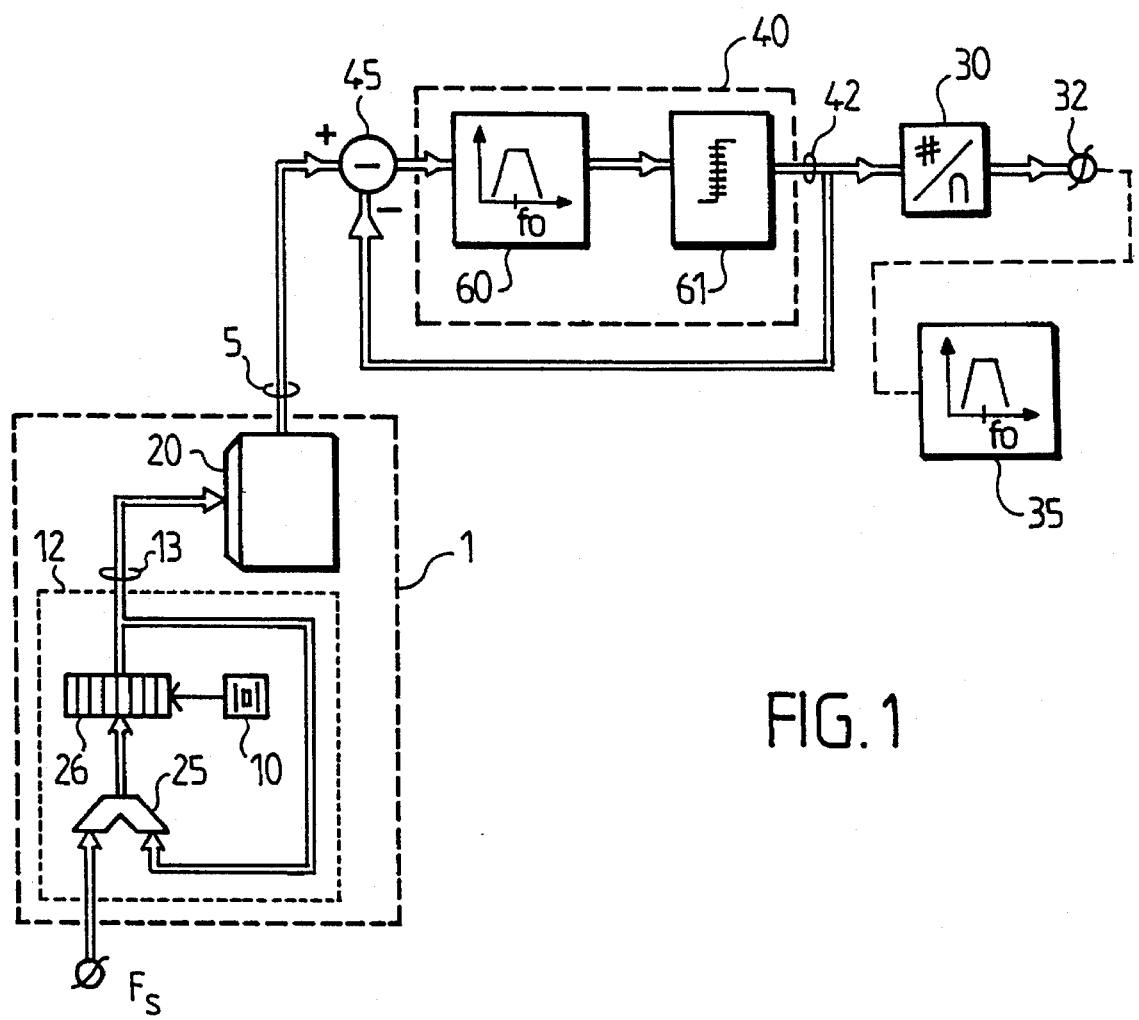
FIG. 1 shows a diagram of an embodiment of the invention.
Figure 2A:
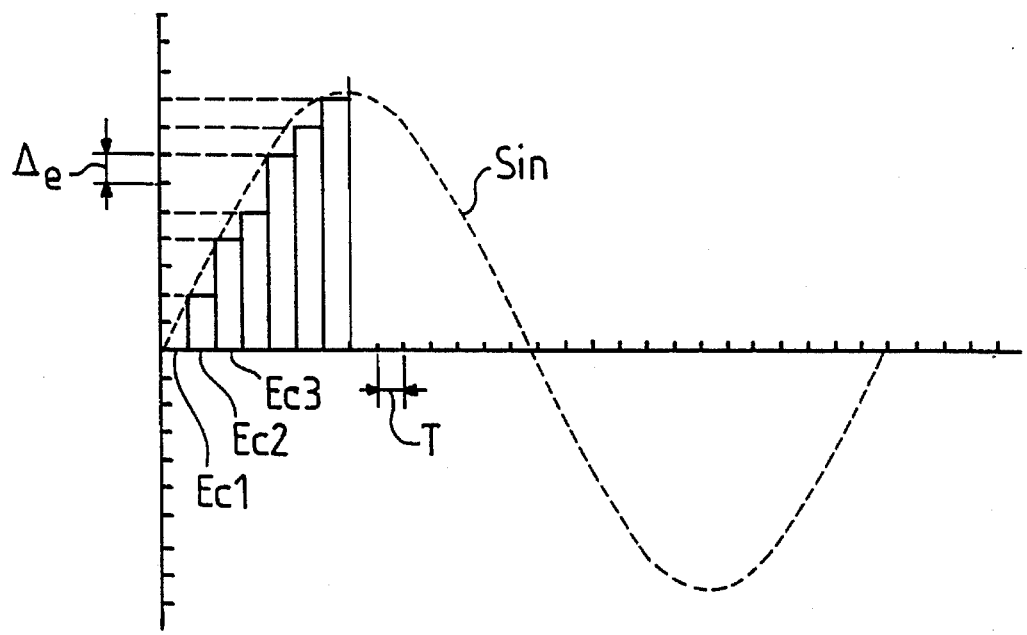
FIGS. 2a and 2b show the shapes of the samples of the first and second series.

FIG. 1 shows in reference 1 a digital generator circuit. This circuit produces on its output 5 a first series of digital samples Ec1, Ec2, Ec3 . . . , representing a sine shape Sin as represented in FIG. 2a. These samples are binary words of N bits, for example, N=16, and are produced in timing with the clock of a clock circuit 10. This circuit 1 comprises, according to the embodiment shown in FIG. 1, an accumulator 12 whose output 13 is connected to the addressing input of a memory 20. The accumulator is formed in customary fashion by an adder element 25 whose output is connected to a register 26. The output of this register forms the output of the accumulator and is further connected to a first input of the element 25. The second input of this element 25 receives the indication in digital form of the synthesis frequency $F_s$. This frequency may vary in steps of $\Delta F_s$ as a function of the desired use. The input of this register is connected to the output of the element 25 and its load control to the output of the clock circuit 10. After a process proposed by the invention the samples on output 5 are applied to the input of a digital-to-analog converter 30 which produces on output 32 a sine-shaped signal. This signal does not present parasitic signals which are hard to suppress by an analog band-pass filter 35 for which no critical constraint is imposed.

According to the invention the digital-to-analog converter 30 processes a second series of samples of binary words of N' bits, for example N'=12, derived from the samples of the first series. An assembly 40 is provided for supplying on its output 42, connected to the converter circuit 30, samples which are filtered and have truncated numbers of bits. There is also provided a negative feedback loop formed by a subtracter element 45, which subtracts the samples of the second series which occur on the output 42 of said assembly 40, from the samples of the first series which occur on output 5.

Figure 2B:
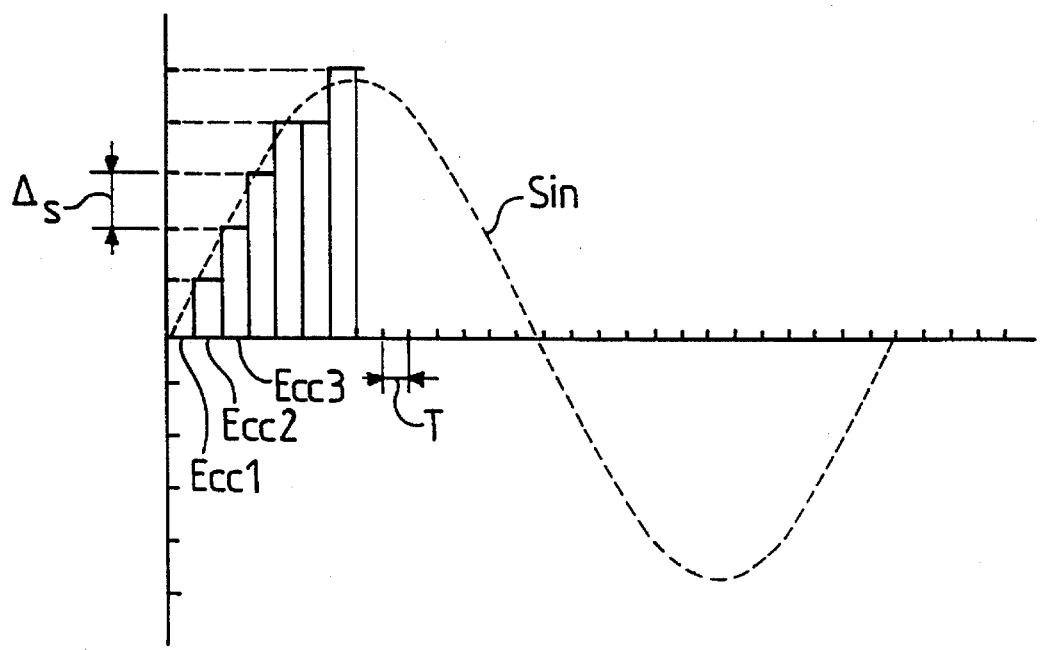
Figure 4:
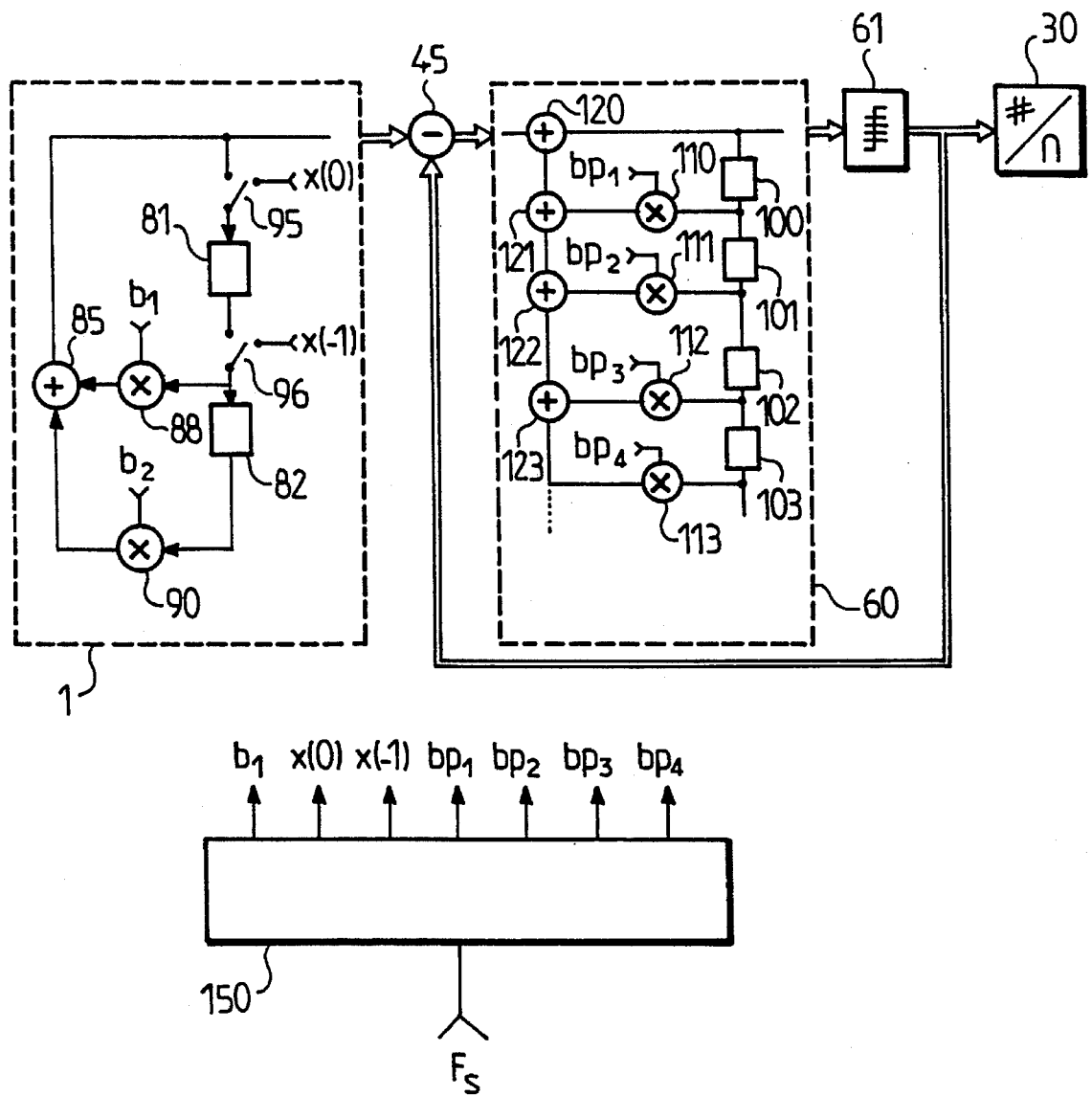
FIG. 4 shows an advantageous embodiment for a synthesizer arrangement according to the invention.

The assembly 40 is formed first of all by a digital filter 60, of which an embodiment is shown in FIG. 4, and a truncating element 61 which reduces the number of bits of the binary words applied to its input. This is shown in a diagrammatic form in FIG. 2b in which the graduations $\Delta_s$ on the Y axis are more interspaced than the graduations $\Delta_e$ of FIG. 2a. Ecc1, Ecc2, Ecc3, . . . , are the samples established according to this new graduation for defining the sine shape Sin. Element 61 may be embodied by a read-only memory or quite simply by discarding the least significant bits. Filter 60 is centred around a frequency fo, which is the mean value of the variation of $F_s$.

Figure 3:
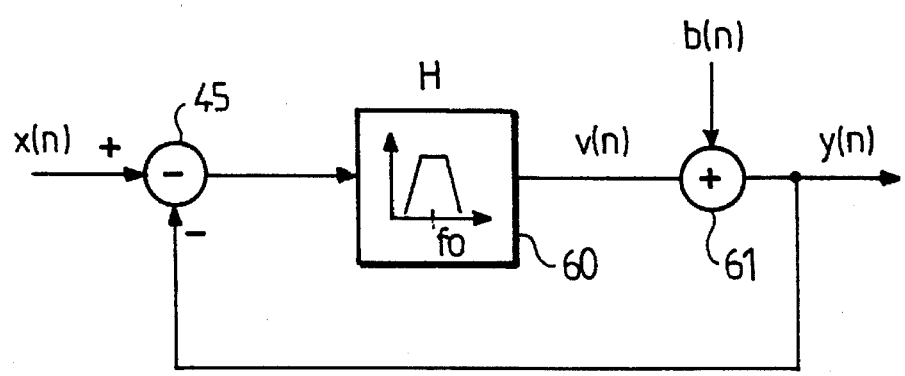
FIG. 3 shows the operational diagram of the synthesizer arrangement according to the invention.

FIG. 3 is a diagram intended to explain the arrangement according to the invention. The values used are variables sampled at the rate T, where T is the sampling period fixed by the clock 10, and they are considered at instant "n". Thus, x(n) represents the sample on output 5, v(n) is the sample on the output of filter 60 and y(n) is the sample on the output 42 of the assembly 40. In this diagram are only represented the elements necessary for this explanation. It should be noted that the truncating unit 61 is represented by an adder which adds noise b(n) to the signal v(n) on the output of the filter 60. This noise b(n) represents the error made by the truncating element in the samples that have the largest number of bits. By taking the Z-transforms of these values X(Z), V(Z) and Y(Z) and by utilizing the Z transfer function of the filter 60, which is written as H(Z), the following relationships are established:

$$V(Z)=[X(Z)-Y(Z)]H(Z)$$

$$Y(Z)=V(Z)+B(Z)$$

which finally yields:

$$Y(Z) = \frac{X(Z)H(Z)}{1+H(Z)} + \frac{B(Z)}{1+H(Z)}$$

The latter formula shows that if H(Z) has a large modulus, Y(Z) comes close to X(Z), whereas the contribution of B(Z) is diminished by the value of the modulus H(Z).

Needless to observe that the errors caused by the truncating element will always occur, but that their spectrum is discarded outside the passband of the filter, so that the analog filter 35 can thus simply discard these spurious components.

FIG. 4 shows a preferred embodiment of the invention.

In this embodiment the digital generator circuit 1 is a digital resonator circuit. It is formed by two delay elements 81 and 82 arranged in a cascade combination. The input of element 81 is connected to the output of an adder element 85 which constitutes that of circuit 1. The adder element 85 receives the result from two multiplier elements 88 and 90 which multiply the samples on the output of the elements 81 and 82 by $b_1$ and $b_2$, respectively. Two switches 95 and 96 make it possible to apply initial values to the inputs of the elements 81 and 82. It is easy to show that such a circuit oscillates with a frequency $F_s$, defined by the value $b_1$. This value $b_1$ provides the determination of the tuning frequency $F_s$:

$$\cos 2\pi F_s T = +b_1/2$$

$$b_2 = -1$$

To ensure proper stability of the produced digital wave, this circuit is reset with a period Ti by the following values. This is performed by acting on the switches 95 and 96 (Ti has a value of the order of a second and is selected to avoid any unwanted discontinuity):

$$x(0)=A$$

$$x(-1)=A \cos 2\pi F_s T$$

where A is a constant defining the wave amplitude.

FIG. 4 also shows a possible structure of the digital filter 60. This is a structure of a purely recursive filter formed by a plurality of delay elements 100, 101, 102, 103, . . . , connected to the output of the filter. The signals on the outputs of these delay elements are multiplied by various factors $bp_1$, $bp_2$, $bp_3$, $bp_4$, . . . , by multiplier elements 110, 111, 112, 113, . . . A series of adder elements 120 to 123 . . . add all the signals on the outputs of the elements 110, 111, 112, 113, . . . to the input signal.

The values of these various factors $bp_1$, $bp_2$, $bp_3$, $bp_4$, . . . depend on the synthesis frequency $F_s$ and on the spectral purity to be obtained. These values determine the characteristic of the filtering. In the document "TRAITEMENT NUMERIQUE DU SIGNAL" by M. Bellanger, published in the Masson editions, all the indications for the realisation of this filter as well as other possible structures and not necessarily strictly recursive filters will be found.

A converter element 150 ensures the changes of the various values $bp_1$, $bp_2$, $bP_3$, $bp_4$, x(0) and x(1) as a function of the synthesis value $F_s$.

Figure 5A:
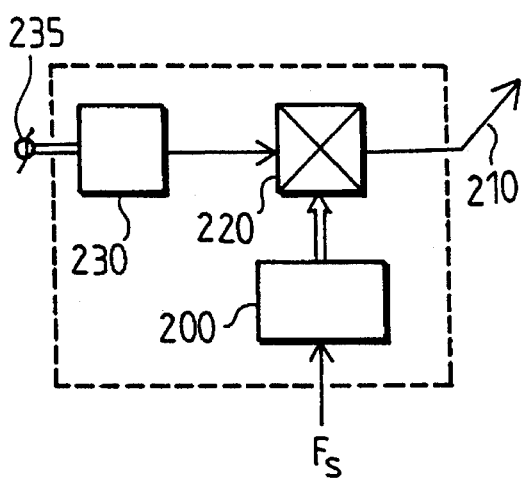
FIGS. 5a and 5b show a transmitter and a receiver station comprising such an arrangement.
Figure 5B:
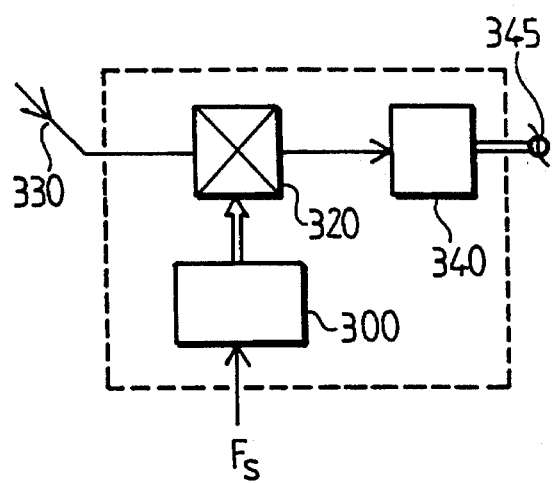

FIG. 5 shows in a a transmitter station comprising a synthesizer arrangement 200 according to the invention. The arrangement 200 is used for fixing the carrier frequency of the transmit signal on antenna 210. A modulator 220 modulates this frequency as a function of information signals produced by processor circuit 230 which receives on a terminal 235 the useful information to be transmitted.

FIG. 5 shows in b a receiver station comprising a synthesizer arrangement 300 in accordance with the invention. The arrangement 300 is used as a local oscillator for modulating or loading, by circuit 320, the frequency of the wave received via the antenna 330. A processing circuit 340 establishes the information for the user on a terminal 345.

The foregoing merely illustrates the principles of the invention. It will thus be appreciated that those skilled in the art will be able to devise various arrangements which, although not explicity described or shown herein, embody the principles of the invention and are thus within its spirit and scope.

I claim:

1. Frequency synthesizer arrangement, which arrangement comprises a digital signal generator circuit for producing a first series of digital samples which are representative of the signal to be synthesized and are formed by binary words of N bits, and a digital-to-analog converter circuit for producing said signal in analog form, characterized in that an assembly is provided for filtering the samples of the first series in accordance with a band-pass characteristic curve and for supplying to said digital-to-analog converter circuit a second series of samples formed by binary words of N' bits, where N≧N', and in that a negative feedback loop is provided for subtracting the samples of the second series from the samples of the first series.

2. Frequency synthesizer arrangement as claimed in claim 1, characterized in that the digital signal generator circuit is formed by a memory containing the digital samples addressed by a code which defines the synthesis frequency.

3. Frequency synthesizer arrangement as claimed in claim 2, characterized in that the assembly comprises a recursive digital filter formed by at least one delay element and one adder element for summing the samples at the inputs and outputs of said delay elements weighted by filter weight values.

4. Frequency synthesizer arrangement as claimed in claim 1, characterized in that the digital signal generator circuit is formed by a digital resonator circuit comprising at least one delay element and one adder element for summing samples at the inputs and outputs of said delay elements weighted by tuning weight values.

5. Frequency synthesizer arrangement as claimed in claim 4, characterized in that the assembly comprises a recursive digital filter formed by at least one delay element and one adder element for summing the samples at the inputs and outputs of said delay elements weighted by filter weight values.

6. Frequency synthesizer arrangement as claimed in claim 5, characterized in that a control circuit is provided which produces the tuning and filter weight values as a function of the synthesis frequency.

7. Frequency synthesizer arrangement as claimed in claim 5, characterized by control means for producing the tuning and filter weight values as a function of the synthesis frequency.

8. Frequency synthesizer arrangement as claimed in claim 1, characterized in that the assembly comprises a recursive digital filter formed by at least one delay element and one adder element for summing the samples at the inputs and outputs of said delay elements weighted by filter weight values.

9. The frequency synthesizer as defined in claim 1, wherein the pass band of said digital filter is centered on the frequency desired to be synthesized by the frequency synthesizer.

10. The frequency synthesizer as defined in claim 1, wherein said digital filter is a recursive filter.

11. A method for synthesizing a frequency, comprising the steps of:

producing a first series of N-bit length digital samples which are representative of the signal to be synthesized;

subtracting from said first series of samples a second series of N'-bit length digital samples, where $N \geq N'$, said second series of samples being generated by filtering a previous result of said subtracting step and truncating the result of the filtering; and performing digital-to-analog conversion on said second series of samples.

12. A frequency synthesizer, comprising:

a digital signal generator circuit for producing a first series of digital samples which are representative of the signal to be synthesized;

a digital circuit including (i) a digital filter for supplying as an output a version of a digital signal supplied thereto which is filtered in accordance with a band-pass characteristic curve, (ii) a truncater for supplying as an output a truncated version of the filtered version of said digital signal supplied by said filter;

a subtracter for subtracting the truncated filtered output of said digital circuit from said first series of digital samples; and a digital-to-analog converter circuit for converting the truncated filtered output of said digital circuit into analog form;

wherein said digital signal supplied to said digital filter is the output of said subtracter.

* * * * *